(12) United States Patent
Iwamoto et al.

(10) Patent No.: US 9,904,110 B2
(45) Date of Patent: Feb. 27, 2018

(54) SEGMENT DISPLAY-TYPE LIQUID CRYSTAL DISPLAY

(71) Applicant: STANLEY ELECTRIC CO., LTD., Tokyo (JP)

(72) Inventors: Yoshihisa Iwamoto, Tokyo (JP); Kunihiko Katano, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 32 days.

(21) Appl. No.: 13/782,899

(22) Filed: Mar. 1, 2013

(65) Prior Publication Data

US 2013/0229599 A1    Sep. 5, 2013

(30) Foreign Application Priority Data

Mar. 2, 2012   (JP) .................................. 2012-046541

(51) Int. Cl.
G02F 1/13363    (2006.01)
G02F 1/1339    (2006.01)
G02F 1/1345    (2006.01)

(52) U.S. Cl.
CPC ...... *G02F 1/133636* (2013.01); *G02F 1/1339* (2013.01); *G02F 1/1345* (2013.01)

(58) Field of Classification Search
CPC ....... G02F 1/13394; G02F 2001/13396; G02F 1/1341
See application file for complete search history.

(56) References Cited

U.S. PATENT DOCUMENTS

| | | |
|---|---|---|
| 5,784,137 A | 7/1998 | Shiomi et al. |
| 5,790,218 A * | 8/1998 | Koden et al. .................. 349/92 |
| 6,304,306 B1 | 10/2001 | Shiomi et al. |

(Continued)

FOREIGN PATENT DOCUMENTS

| | | |
|---|---|---|
| CN | 101290419 A | 10/2008 |
| JP | 54079645 A | 6/1979 |

(Continued)

OTHER PUBLICATIONS

U.S. Appl. No. 13/782,824; First Named Inventor: Yoshihisa Iwamoto; Title: "Liquid Crystal Display", filed Mar. 1, 2013.

(Continued)

*Primary Examiner* — Lauren Nguyen
(74) *Attorney, Agent, or Firm* — Holtz, Holtz & Volek PC (57) ABSTRACT

A liquid crystal display includes first and second substrates placed opposite each other, a common electrode on one side of the first substrate to substantially cover a whole surface, a segment electrode on one side of the second substrate, a routing wire on one side of the second substrate and connected to the segment electrode, a liquid-crystalline resin film without electrical conductivity on one side of the second substrate, and a liquid crystal film between the substrates, and being subject to twisted alignment between the substrates. The liquid-crystalline resin film has refractive index anisotropy being substantially equal to that of a liquid crystal material of the liquid crystal film, is subject to twisted alignment, and is disposed to fill a space between the routing wire and the common electrode. The liquid crystal film is disposed to fill a space between the segment electrode and the common electrode.

5 Claims, 6 Drawing Sheets

(56) References Cited

U.S. PATENT DOCUMENTS

| | | | |
|---|---|---|---|
| 6,618,113 B1 | 9/2003 | Ulrich et al. | |
| 2006/0146267 A1* | 7/2006 | Choi | G02F 1/133377 |
| | | | 349/156 |
| 2008/0259255 A1* | 10/2008 | Chae et al. | 349/106 |

FOREIGN PATENT DOCUMENTS

| | | | |
|---|---|---|---|
| JP | 09105940 A | | 4/1997 |
| JP | 2000098411 A | | 4/2000 |
| JP | 2001-021899 A | | 1/2001 |
| JP | 2001-056470 | * | 2/2001 |
| JP | 2001056470 A | | 2/2001 |
| JP | 2001183673 A | | 7/2001 |
| JP | 2006-309117 | * | 9/2006 |
| JP | 2006-309117 A | | 11/2006 |

OTHER PUBLICATIONS

Japanese Office Action (and English translation thereof) dated Aug. 24, 2015, issued in counterpart Japanese Application No. 2012-046541.

Chinese Office Action (and English translation thereof) dated Jul. 15, 2016, issued in counterpart Chinese Application No. 2013100649741.

* cited by examiner

SEGMENT DISPLAY-TYPE LIQUID CRYSTAL DISPLAY

BACKGROUND OF THE INVENTION

1. Field of the Invention

The present invention relates to a liquid crystal display (particularly to a segment display-type liquid crystal display).

2. Description of the Related Art

With a general liquid crystal display, electrodes are provided on the upper and lower substrates respectively, and alignment films are provided on the electrodes, respectively. In addition, the upper and lower substrates are superimposed so that the respective electrodes face each other. Here, in order to provide a liquid crystal film having a predetermined thickness (for instance, several nm) between the upper and lower substrates, a spherical spacer is disposed between the upper and lower substrates. Polarizers are attached to the outer sides of the upper and lower substrates, respectively. In this kind of liquid crystal display, by applying voltage to the liquid crystal film by using the respective electrodes of the upper and lower substrates, the alignment of the liquid crystal film of the display area, which is the portion that both electrodes are superimposed, is changed in order to switch the bright display state and dark display state in terms of appearance. As one type of liquid crystal display described above, known is a segment display-type liquid crystal display capable of displaying a display pattern including a predetermined design or text. This kind of segment display-type liquid crystal display comprises an effective display area including a plurality of segment display areas for displaying, for example, an arbitrary design or the like, and an external extraction electrode terminal area for electrically operating the respective display areas of the effective display area. The term "effective display area" as used herein refers to an area that is exposed without being covered when housing the liquid crystal display in a case of various devices, and which is viewable from the outside.

In order to realize the foregoing segment display-type liquid crystal display, a segment electrode and a common electrode are provided to one face of each of the upper and lower substrates, the upper and lower substrates are superimposed so that both electrodes face each other, and the area where both electrodes overlap form be a predetermined display pattern. Here, the portion where the segment electrode and the common electrode do not overlap is referred to as a "routing wire", and functions as a wire for connecting the portion to be used for display to the external extraction electrode. The layout of this kind of routing wire needs to be designed so that the routing wire is arranged on only either one of the upper or lower substrate. This is because, when the routing wires overlap, change in the alignment of the liquid crystal film in such overlapping area, which is normally not required, will occur, and cause a display defect. A previous example of this kind of liquid crystal display is disclosed, for example, in JP-A-2006-309117 (Patent Document 1).

With a conventional liquid crystal display, as the respective upper and lower substrates, for instance, a glass substrate having a thickness of about 0.3 to 1.1 mm has been often used. This is because a glass substrate has a high glass transition point of 500° C. or higher, has superior resistance against various chemicals, has relatively superior workability and, therefore, a glass substrate can broaden the options of various chemicals to be used in high-temperature processes of 150° C. or higher and electrode patterning, and can be handled favorably. Meanwhile, a liquid crystal display is also provided which uses a flexible plastic substrate or film substrate. This kind of liquid crystal display is advantageous in that it is possible to realize a lighter weight and a thinner profile in comparison to a liquid crystal display using a glass substrate, and is also advantageous in that it is flexible and superior in shock resistance. Thus, it is possible to relatively easily realize a shockproof display device or a curved display device that is difficult to be realized when a glass substrate is used.

Nevertheless, since the photolithography technique is often used for the patterning of the segment electrode and the common electrode on the upper and lower substrates, this includes numerous processes that considerably damage the substrate; for instance, heating and cooling of the substrate, irradiation of ultraviolet rays, and exposure to acid chemicals and alkali chemicals. When using the foregoing plastic substrate or film substrate, these substrates need to comprise high-temperature process resistance, chemical resistance and handling performance that are equivalent to a glass substrate. Nevertheless, options of such a plastic substrate and the like that satisfy all of the foregoing conditions are limited, and also disadvantageous in terms of cost. In addition, since a substrate is disposed between two polarizers on application to a liquid crystal display, the phase difference in the substrate surface needs to be substantially zero, and the options are even more limited. Thus, simplification of the common electrode is desired so that the patterning of the common electrode can be omitted, or reduced as much as possible. Nevertheless, if simplification of causing the entire surface of the substrate to be the common electrode is performed, as described above, change in the alignment of the liquid crystal film will occur in the overlapping area of the routing wire connected to the segment electrode, and the common electrode, the change in the alignment being normally not required, thereby causing a display defect.

With a general liquid crystal display, on the other hand, in order to maintain the gap of the upper and lower substrates and cause the liquid crystal film to have a uniform layer thickness, a spherical spacer is disposed between the upper and lower substrates. This kind of spherical spacer is equally and randomly dispersed, in the manufacturing process of a liquid crystal display, on one of the substrates via the dry spraying method which is described, for example, in JP-A-2001-21899 (Patent Document 2). Nevertheless, with the foregoing method, since the spacer is randomly disposed on one of the substrates, the spacer may be in the display area. The spacer that is in the display area as described above will induce the non-uniformity of the alignment in the liquid crystal film during non-application of voltage or during voltage application, and may cause a drop in the display quality of the liquid crystal display.

Meanwhile, proposed is a liquid crystal display element having a structure of maintaining the gap of the upper and lower substrates by using a columnar spacer made from photosensitive resin in substitute for the spherical spacer. With a liquid crystal display having the foregoing structure, since a spacer can be intentionally disposed at a position where an alignment defect will not occur in the display area, it is possible to prevent the drop in the display quality during non-application of voltage or during voltage application. This kind of columnar spacer is mainly used in a dot matrix-type liquid crystal display in which rectangular pixels are formed in a matrix. In this case, a structure where the columnar spacer is disposed below the black mask, which is disposed outside of the effective pixels, and the columnar spacer is not disposed in the effective pixels, would be well known.

In general, the spherical spacer or columnar spacer that is used in a liquid crystal display as described above is formed using a material having optical isotropy, unlike a liquid crystal material having optical anisotropy. Accordingly, unless a light-shield film is disposed on at least one of the substrates in an area where the spacer is disposed, leakage of light will occur in the area where the spacer is disposed when the liquid crystal display is viewed from the front or viewed from an oblique direction, and cause a drop in the display quality of the liquid crystal display. For example, when the upper and lower polarizers are disposed in a crossed Nicol arrangement to be a normally white mode in a twisted nematic-type liquid crystal display in which the alignment direction of the liquid crystal molecules in the liquid crystal film is twisted 90° between the upper and lower substrates, the portion where the spacer does not exist (portion where the liquid crystal molecules exist) in the liquid crystal film becomes a bright display state, and the portion where the spacer exists becomes a dark display state. Thus, the dark display state portion may become visible in terms of appearance, and cause a drop in the display quality. Note that, while it is relatively easy to provide a light-shield film in correspondence to a columnar spacer in which the positional arrangement thereof is predetermined, it is difficult to provide a light-shield film in a case of a spherical spacer that is randomly disposed on the substrate surface via the dry spraying method or the like, in accordance with the position thereof. Moreover, while a normally white mode is characterized in having a relatively high transmittance of the bright display state during non-application of voltage, the transmittance will drop when a light-shield film is provided. Thus, it could be said that it would be better not to use a light-shield film as much as possible.

SUMMARY OF THE INVENTION

One object of a specific mode of the present invention is to provide a liquid crystal display capable of avoiding display defects that may arise when simplifying the common electrode.

A liquid crystal display according to an aspect of the present invention includes: (a) a first substrate and a second substrate placed opposite each other; (b) a common electrode provided on one face side of the first substrate so as to substantially cover a whole surface; (c) a segment electrode provided to one face side of the second substrate; (d) a routing wire provided to one face side of the second substrate and connected to the segment electrode; (e) a liquid-crystalline resin film without electrical conductivity provided to one face side of the second substrate; and (f) a liquid crystal film provided between the first substrate and the second substrate, and being subject to twisted alignment between the first substrate and the second substrate, (g) wherein the liquid-crystalline resin film has refractive index anisotropy which is substantially equal to refractive index anisotropy of a liquid crystal material of the liquid crystal film, is subject to twisted alignment, and is disposed in a manner of filling at least a space between the routing wire and the common electrode, and (h) wherein the liquid crystal film is disposed in a manner of filling at least a space between the segment electrode and the common electrode.

A liquid crystal display according to another aspect of the present invention includes: (a) a first substrate and a second substrate placed opposite each other; (b) a common electrode provided on one face side of the first substrate so as to substantially cover a whole surface; (c) a segment electrode provided to one face side of the second substrate; (d) a routing wire provided to one face side of the second substrate and connected to the segment electrode; (e) a liquid-crystalline resin film without electrical conductivity provided to one face side of the second substrate; and (f) a translucent resin film configured from an optically isotropic transparent resin, and disposed between the second substrate and the liquid-crystalline resin film; and (g) a liquid crystal film provided between the first substrate and the second substrate, and being subject to twisted alignment between the first substrate and the second substrate, (h) wherein the liquid-crystalline resin film has refractive index anisotropy which is greater than refractive index anisotropy of a liquid crystal material of the liquid crystal film, is subject to twisted alignment, and disposed in a manner of filling at least a space between the routing wire and the common electrode, and (i) wherein the liquid crystal film is disposed in a manner of filling at least a space between the segment electrode and the common electrode.

In any one of the liquid crystal displays described above, it is possible to considerably simplify, or omit, the patterning process of the common electrode by providing the common electrode on one face side of the first substrate so as to substantially cover a whole surface. It is thereby possible to use, for example, a plastic substrate or a film substrate as the first substrate. Here, by interposing a non-conductive liquid-crystalline resin film at least between the routing wire and the common electrode, it is possible to electrically isolate this area, and cause the optical property of this area to be equal or close to the optical property of the liquid crystal film. Moreover, when there is a difference in the refractive index anisotropy between the liquid-crystalline resin film and the liquid crystal film, by using a translucent resin film and causing the thickness of the two to differ, the retardation can be made to be substantially the same. Accordingly, it is possible to avoid a display defect from arising in the overlapping area of the routing wire and the common electrode.

In the liquid crystal display described above, the liquid-crystalline resin film is preferably disposed in a manner of filling a space between a part where neither the segment electrode nor the routing wire is provided on one face side of the second substrate, and the common electrode.

It is thereby possible to cause the external appearance of the area where the segment electrode and the routing wire do not exist to be substantially equivalent to the external appearance of the area where the routing wire and the common electrode are superimposed.

Preferably, the liquid crystal display described above further includes a dummy electrode complementarily disposed, on one face side of the second substrate, to an area other than an area where the segment electrode and the routing wire are disposed.

It is thereby possible to substantially cover the entire one face side of the second substrate with the conductive film. In General, since a liquid-crystalline resin film tends to have stronger adhesion to a conductive film such as ITO (indium tin oxide) than to a substrate surface of a glass substrate or the like, adhesion between the liquid-crystalline resin film and the second substrate can be further improved.

In the liquid crystal display described above, the common electrode may be divided into a plurality of portions, and substantially fully covers one face of the first substrate by combining the plurality of divided portions.

It is thereby possible to be driven by multiplex driving.

In the liquid crystal display described above, the first substrate is preferably a plastic substrate or a film substrate.

As described above, since the processing of the common electrode can be reduced as much as possible, a substrate made from a material, which lacked high-temperature process resistance and chemical resistance in conventional technology, can be used as the first substrate. In addition, it is possible to easily realize a flexible liquid crystal display.

DESCRIPTION OF THE PREFERRED EMBODIMENTS

Embodiments of the present invention are now explained with reference to the accompanying drawings.

Figure 1:
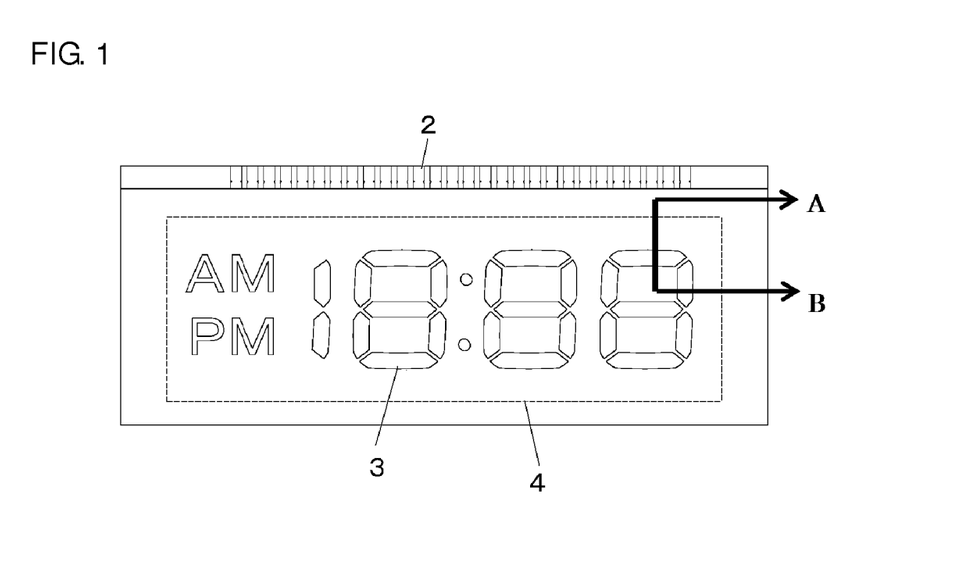
FIG. 1 is a plan view schematically showing the configuration of a liquid crystal display according to one embodiment.

FIG. 1 is a plan view schematically showing a configuration of a liquid crystal display according to one embodiment. As shown in FIG. 1, the liquid crystal display of this embodiment is a segment display-type liquid crystal display for realizing a clock display, and comprises a plurality of segment display areas 3 within an effective display area 4 indicated with a dotted line. The term "effective display area" as used herein can be defined as an area that is exposed without being covered by a housing of the device when implementing the liquid crystal display into any of various devices. Moreover, the liquid crystal display is provided with an external extraction electrode terminal area 2 for controlling the bright/dark display state of the segment display areas 3. The external extraction electrode terminal area 2 protrudes from the front-side substrate.

Figure 2:
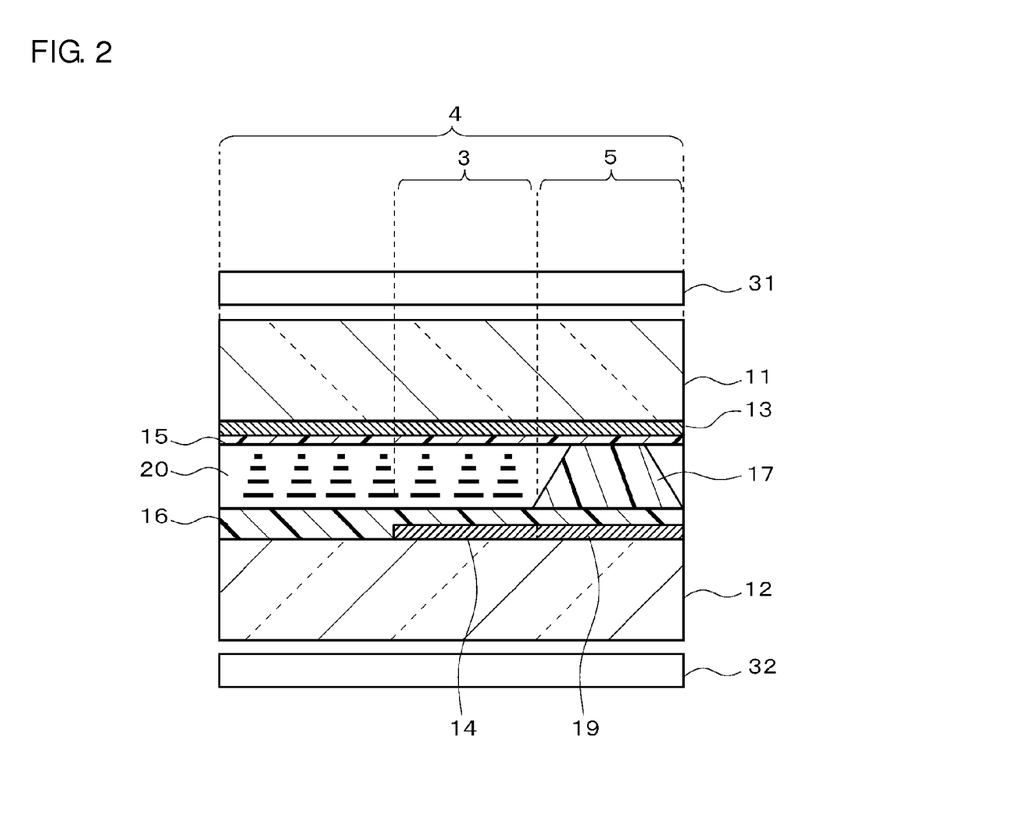
FIG. 2 is a cross section schematically showing the configuration of the liquid crystal display according to a first embodiment.

FIG. 2 is a cross section schematically showing the configuration of the liquid crystal display according to a first embodiment. The cross section shown in FIG. 2 corresponds to the cross section in the A-B line direction shown in FIG. 1 (same with FIG. 11 described later). The liquid crystal display of the first embodiment shown in FIG. 2 mainly comprises a first substrate 11 and a second substrate 12 placed opposite each other, and a liquid crystal film 20 disposed between the two substrates. A first polarizer 31 is disposed on the outer side of the first substrate 11, and a second polarizer 32 is disposed on the outer side of the second substrate 12. The periphery of the liquid crystal film 20 is sealed with a seal member (not shown).

The first substrate 11 and the second substrate 12 are respectively, for example, transparent substrates such as glass substrates, plastic substrates, or film substrates. The gap between the first substrate 11 and the second substrate 12 is maintained at a predetermined distance (for instance, about several μm).

The common electrode 13 is provided on one face of the first substrate 11. Moreover, the segment electrode 14 and the routing wire 19 are provided on one face of the second substrate 12. Each of the common electrode 13, the segment electrode 14 and the routing wire 19 is configured, for example, by suitably patterning a transparent conductive film made of ITO (indium tin oxide) or the like. In this example, the area where the common electrode 13 and the segment electrode 14 face each other corresponds to the segment display area 3, and the area where the common electrode 13 and the routing wire 19 face each other corresponding to the wire part 5. The common electrode 13 is provided on one face side of the first substrate 11 so as to substantially cover a whole surface. The segment electrode 14 and the routing wire 19 are patterned in a shape according to the display pattern on one face of the second substrate 12.

An alignment film 15 is provided, on one face side of the first substrate 11, so as to cover the entire face within the seal frame of the common electrode 13. Similarly, an alignment film 16 is provided, on one face side of the second substrate 12, so as to cover the segment electrode 14 and the routing wire 19. In this embodiment, as the alignment film 15 and the alignment film 16, used are films (horizontal alignment films) which restrict the alignment of the liquid crystal film 20 during the initial state (during non-application of voltage) to a horizontal alignment. Each alignment film 15, 16 has been subject to an alignment process such as a rubbing process, and each alignment film 15, 16 provides a pretilt angle of several degrees relative to the liquid crystal molecules of the liquid crystal film 20.

A liquid-crystalline resin film 17 is provided on the alignment film 16 of the second substrate 12, and disposed between the first substrate 11 and the second substrate 12. The liquid-crystalline resin film 17 is formed using liquid-crystalline photosensitive resin. Preferably, with the liquid-crystalline resin film 17, the refractive index anisotropy of its formation material is substantially equivalent to the refractive index anisotropy of the liquid crystal material used in the liquid crystal film 20, and it is also preferably non-conductive. The liquid-crystalline resin film 17 has an alignment that is substantially equal to the alignment of the liquid crystal film 20. This kind of molecular alignment can be realized by using the restraining force of alignment of the alignment film 16 provided on the second substrate 12 when forming the liquid-crystalline resin film 17, and by adding a chiral material to the formation material of the liquid-crystalline resin film 17. Specifically, the liquid-crystalline resin film 17 is pattern-formed by applying a predetermined material solution on the alignment film 16 of the second substrate 12, exposing ultraviolet rays in a state of being substantially adhered to a photomask, which was patterned with a light-shield film so that only a predetermined area is exposed, thereafter performing development with an alkali aqueous solution, and performing calcination. In these processes, as a result of a predetermined material solution being applied on the alignment film 16, the alignment is controlled to a 90° twisted alignment as a result of being subject to the restraining force of alignment of the alignment film 16 and the effect of the chiral material. As shown in the diagram, the liquid-crystalline resin film 17 has a cross section shape of a tapered shape which is getting thinner toward the first substrate 11 side, and is tightly disposed so as to fill the space between the common electrode 13 and the routing wire 19.

The liquid crystal film 20 is provided between the first substrate 11 and the second substrate 12. More specifically, the liquid crystal film 20 is disposed between the first substrate 11 and the second substrate 12 so as to fill at least the space between the common electrode 13 and the segment electrode 14. The liquid crystal film 20 is configured, for example, by using a liquid crystal composition obtained by adding a chiral material to a liquid crystal material (nematic liquid crystal material) in which its dielectric constant anisotropy $\Delta\in$ is positive ($\Delta\in>0$), and alignment is controlled to be a 90° twisted horizontal alignment of a mono domain.

The first polarizer 31 and the second polarizer 32 are disposed, for example, so that their mutual absorption axes are substantially orthogonal, and the respective absorption axes are substantially parallel to the alignment direction of the liquid crystal molecules at the respective interfaces of the first substrate 11 and the second substrate 12. For example, the first polarizer 31 and the second polarizer 32 are disposed so that the absorption axis of one is disposed 45° in a clockwise direction relative to the horizontal direction of the effective display area 4, and the absorption axis of the other is disposed 45° in the counterclockwise direction. Since the liquid-crystalline resin film 17 is prepared for the liquid crystal display of this embodiment, preferably, the arrangement area of the liquid-crystalline resin film 17 is visible in terms of appearance so that the visibility is substantially equivalent to the arrangement area of the liquid crystal film 20. Accordingly, the normally white mode in which the transmittance of the liquid crystal display is high during non-application of voltage is the most suitable. Thus, in this embodiment, the molecular alignment of the liquid crystal film 20 is caused to be a 90° twisted alignment, and the absorption axes of the first polarizer 31 and the second polarizer 32 are disposed to be substantially orthogonal.

Figure 3:
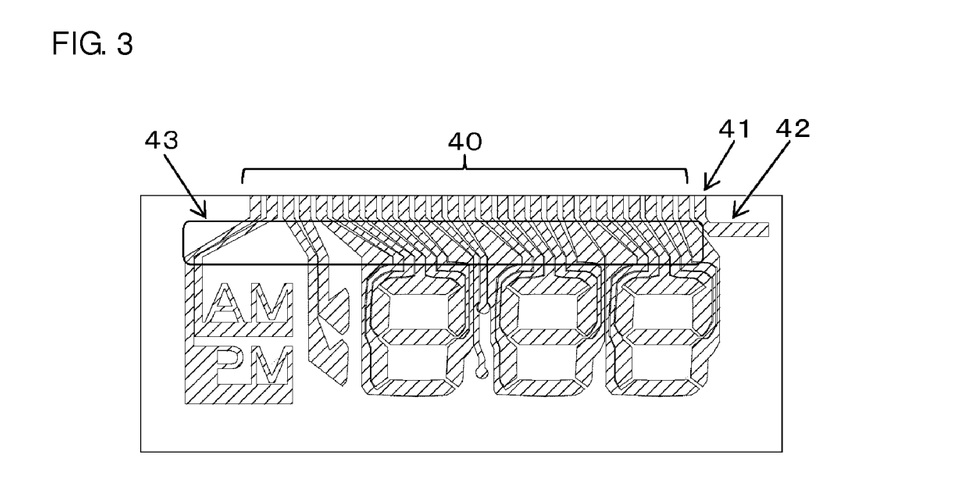
FIG. 3 is a plan view showing a structural example of segment electrodes corresponding to display pattern shown in FIG. 1.

FIG. 3 is a plan view showing a structural example of the segment electrodes corresponding to the display pattern shown in FIG. 1. In this diagram, shown is an example of the segment electrodes when assuming a case of driving the liquid crystal display by static driving. As shown in the diagram, a segment electrode external extraction terminal 40 and a common electrode external extraction terminal 41 are provided to the end part of the substrate surface. In addition, provided within the substrate surface are segment electrode routing wires 43 for connecting the segment electrode external extraction terminals 40 and the segment electrodes, and an inter-substrate conductive pad part 42 connected to the common electrode external extraction terminal 41.

Figure 4:
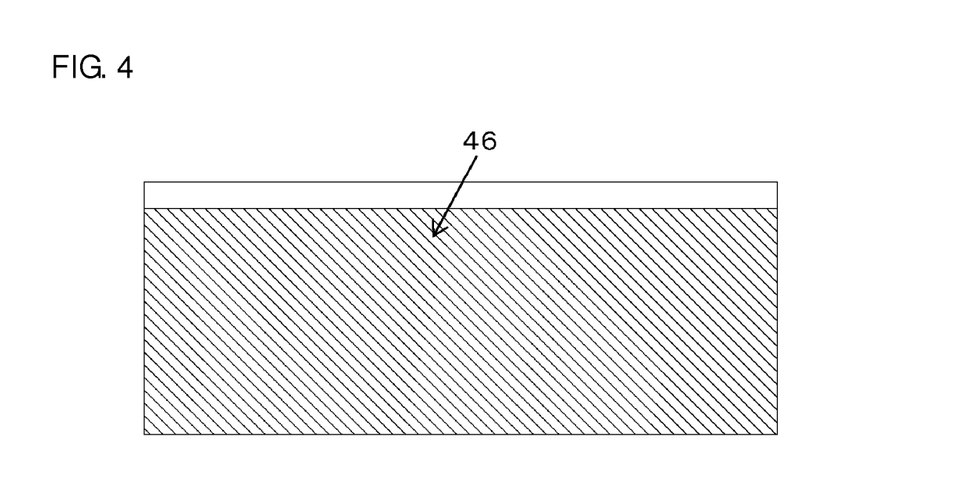
FIG. 4 is a plan view showing a structural example of common electrode corresponding to the segment electrodes shown in FIG. 3.

FIG. 4 is a plan view showing a structural example of the common electrode corresponding to the segment electrodes shown in FIG. 3. As shown in the diagram, the common electrode 46 of this embodiment is provided so as to cover substantially the entire substrate surface. Specifically, common electrode 46 is provided to cover at least the entire effective display area 4. This common electrode 46 is energized via a conductive material such as a seal member or silver paste, with conductive particles mixed therein, at the foregoing inter-substrate conductive pad part 42, thereby connected to the common electrode external extraction electrode 41.

Figure 5:
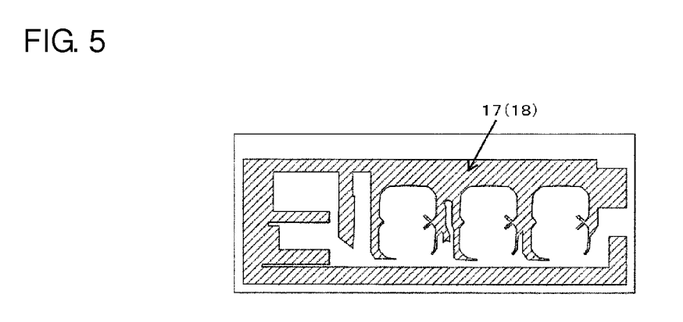
FIG. 5 is a plan view showing a structural example of a liquid-crystalline resin film.

FIG. 5 is a plan view showing a structural example of the liquid-crystalline resin film. As shown in the diagram, the liquid-crystalline resin film 17 is disposed, in the effective display area 4, so as to fill at least the space between the common electrode 13 and the routing wire 19. In the illustrated example, the liquid-crystalline resin film 17 is provided in a manner of covering the overlapping area of the common electrode 13 and the segment electrode routing wires 43, and covering substantially the entire area where neither the segment electrode nor the segment electrode routing wires 43 exist and where the common electrode 13 exists. Note that, in the area where only the common electrode 13 exists, it is also possible to simultaneously form a columnar spacer which functions as a spacer for retaining the interval between the first substrate 11 and the second substrate 12 with the foregoing formation of the liquid-crystalline resin film 17. The columnar spacer in the foregoing case has a tapered cross section shape, has a substantially rectangular shape, a substantially rhomboid shape, or a substantially circular shape in a plan view, and, for example, is disposed regularly in the substrate surface.

Figure 6:
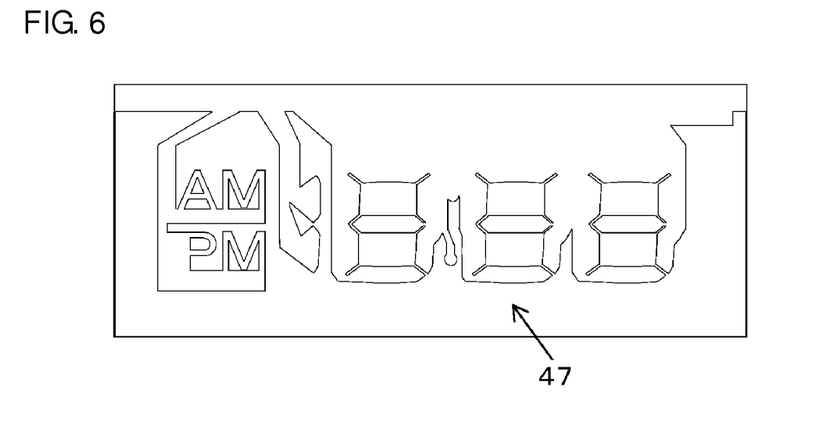
FIG. 6 is a plan view showing a structural example of a dummy electrode.

FIG. 6 is a plan view showing a structural example of a dummy electrode. In general, the liquid-crystalline resin film 17 has greater adhesion to the electrode surface in comparison to the substrate surface. Accordingly, it is also preferable to provide a dummy electrode 47 to a complementary arrangement area relative to the arrangement area of the segment electrodes 14 and the segment electrode routing wires 43 shown in FIG. 3. The dummy electrode 47 is provided being physically separated from the segment electrode 14 and the segment electrode routing wires 43 in a predetermined interval. The dummy electrode 47 may be a floating electrode that does not provide an external terminal, or energized via the common electrode 13 and the conductive particles and cause the two to be the same potential. As a result of providing this kind of dummy electrode 47, in addition to being able to improve the adhesion of the liquid-crystalline resin film 17 to the substrate, it is also possible to improve the uniformity of the liquid crystal film thickness.

Figure 7:
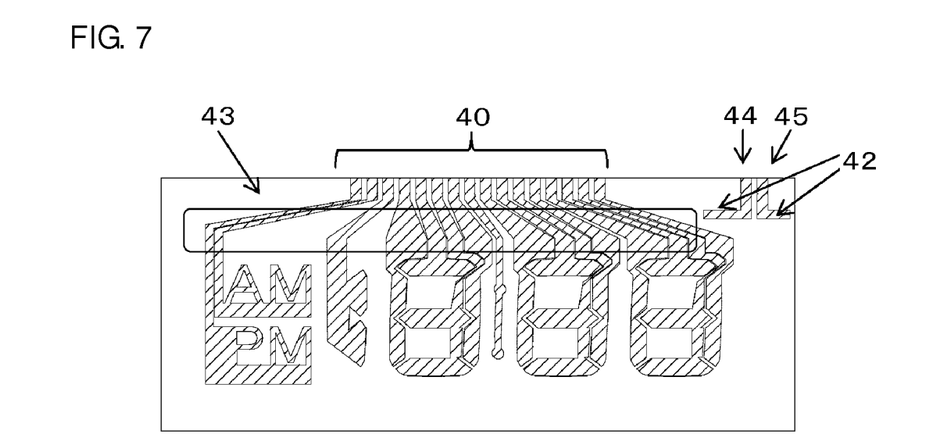
FIG. 7 is a plan view showing another structural example of the segment electrodes corresponding to the display pattern shown in FIG. 1.

FIG. 7 is a plan view showing another structural example of the segment electrodes corresponding to the display pattern shown in FIG. 1. In the diagram, shown is an example of segment electrodes when assuming a case of driving the liquid crystal display by multiplex driving of ½ duty. As shown in the diagram, a segment electrode external extraction terminal 40 and common electrode external extraction terminals 44, 45 are provided to the end part of the substrate surface. In addition, provided within the substrate surface are segment electrode routing wires 43 for connecting the segment electrode external extraction terminal 40 and the segment electrodes, and an inter-substrate conductive pad parts 42 connected to the common electrode external extraction terminals 44, 45.

Figure 8:
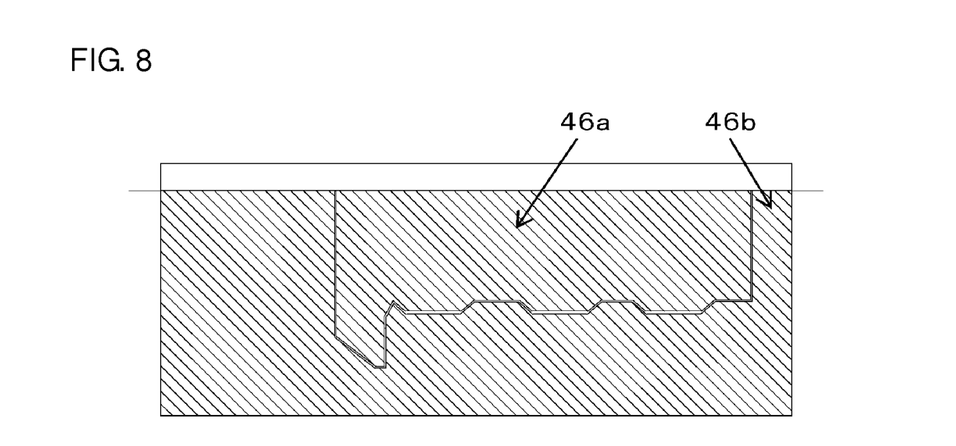
FIG. 8 is a plan view showing a structural example of the common electrode corresponding to the segment electrodes shown in FIG. 7.

FIG. 8 is a plan view showing a structural example of the common electrode corresponding to the segment electrodes shown in FIG. 7. As shown in the diagram, the common electrode of this embodiment is configured from two partial electrodes 46a, 46b that are separated via a regular interval, and provided so that the combination thereof substantially fully covers one face of the second substrate 12. Specifically, the two partial electrodes 46a, 46b as the common electrode are provided so that the combination thereof will cover at least the entire effective display area 4. These partial electrodes 46a, 46b are energized via a conductive material such as a seal member of silver paste, with conductive particles mixed therein, at the foregoing inter-substrate conductive pad part 42, and thereby connected to the common electrode external extraction terminals 44, 45.

Figure 9:
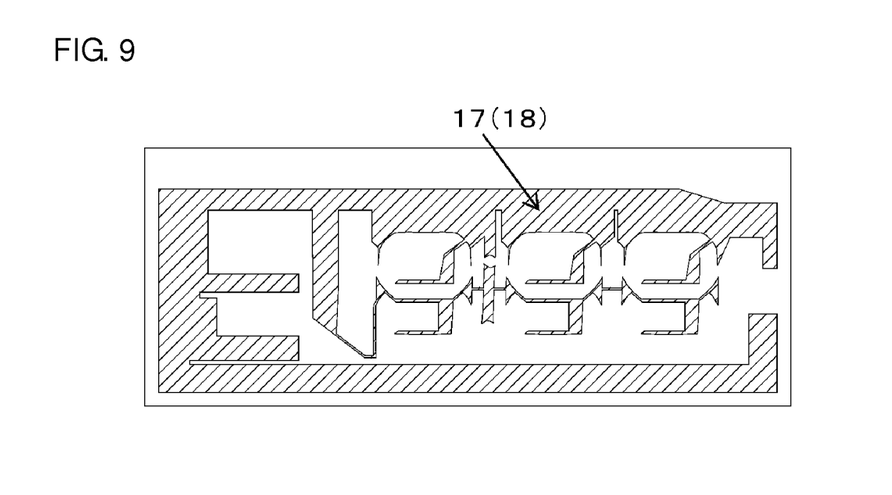
FIG. 9 is a plan view showing another structural example of the liquid-crystalline resin film.

FIG. 9 is a plan view showing another structural example of the liquid-crystalline resin film. Here, the liquid-crystalline resin film 17 is provided so as to cover the boundary region which divides both partial electrodes 46a, 46b as the common electrode. Note that, similar to the above, in an area where only the common electrode exists, a columnar space which functions as a space for retaining the gap between the first substrate 11 and the second substrate 12 may be provided.

Figure 10:
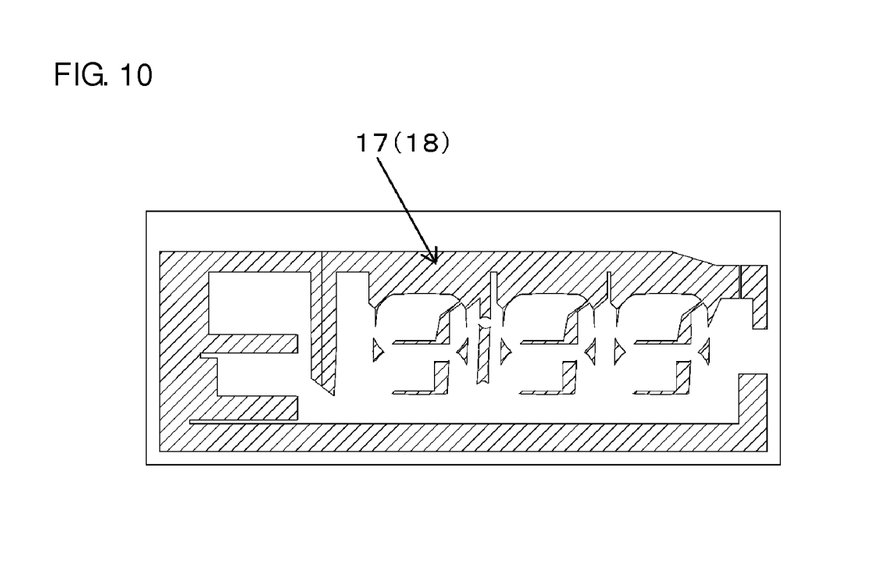
FIG. 10 is a plan view showing another structural example of the liquid-crystalline resin film.

FIG. 10 is a plan view showing another structural example of the liquid-crystalline resin film. As shown in FIG. 10, it is not necessary to provide a liquid-crystalline resin film 17 in the boundary region which divides both partial electrodes 46a, 46b as the common electrode. When comparing this arrangement pattern and the arrangement pattern shown in FIG. 9, there is a thin area of the boundary region which separates the two partial electrodes 46a, 46b in the arrangement pattern of FIG. 9. Thus, when an inlet for vacuum injection is disposed at a part of the right side end of a liquid crystal display element, there is concern that the injection speed of the liquid crystal material will be slower due to the increased bulkhead during the injection. Meanwhile, with the arrangement pattern shown in FIG. 10, since the thin area is eliminated and a bulkhead does not exist, the injection speed of the liquid crystal material can be further increased.

Figure 11:
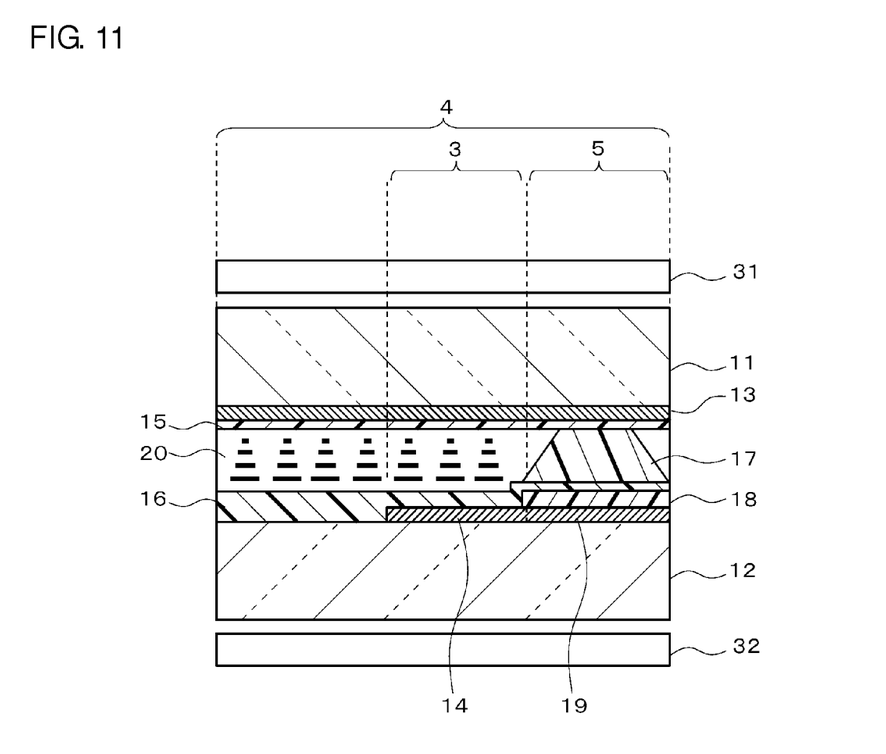
FIG. 11 is a cross section schematically showing the configuration of the liquid crystal display according to the second embodiment.

FIG. 11 is a cross section schematically showing a configuration of the liquid crystal display according to the second embodiment. The liquid crystal display of the second embodiment has a structure that is suitable when the refractive index anisotropy $\Delta n1$ of the constituent material of the liquid-crystalline resin film 17 is greater than the refractive index anisotropy $\Delta n2$ of the liquid crystal material of the liquid crystal film 20. Note that the same reference numerals are given to constituent elements that are common with the liquid crystal display of the first embodiment (refer to FIG. 2), and the detailed explanation thereof is omitted. The liquid crystal display of the second embodiment mainly differs from the foregoing liquid crystal display of the first embodiment with respect to the point that a translucent resin film 18 is provided on the second substrate 12 in correspondence with the liquid-crystalline resin film 17.

The translucent resin film 18 is provided, on one face side of the second substrate 12, on the upper side of the liquid-crystalline resin film 17 by being formed in a pattern of substantially the same shape as the liquid-crystalline resin film 17 (refer to FIG. 5, FIG. 9 and FIG. 10). The translucent resin film 18 is formed by using optically isotropic transparent resin. In addition, the alignment film 16 is formed on one face side of the second substrate 12 so as to cover the segment electrode 14, the routing wire 19 and the translucent resin film 18.

As a result of providing the translucent resin film 18 in correspondence with the liquid-crystalline resin film 17 as described above, the thickness d2 of the liquid crystal film 20 in the area where the translucent resin film 18 does not exist and the thickness d1 of the liquid-crystalline resin film 17 can be caused to differ. In other words, when the refractive index anisotropy of the liquid-crystalline resin film 17 is $\Delta n1$ and the refractive index anisotropy of the liquid crystal material of the liquid crystal film 20 is $\Delta n2$, and $\Delta n1 > \Delta n2$, the relation of the thickness d1 of the liquid-crystalline resin film 17 and the thickness d2 of the liquid crystal film 20 is suitably adjusted so that the retardations $\Delta n1 d1$ and $\Delta n2 d2$ in the respective areas will become substantially equal.

According to this embodiment described above, it is possible to considerably simplify, or omit, the patterning process of the common electrode by providing the common electrode on one face side of the first substrate so as to substantially cover a whole surface. It is thereby possible to use, for example, a plastic substrate or a film substrate as the first substrate. Here, by interposing a non-conductive liquid-crystalline resin film (a liquid-crystalline resin film without electrical conductivity) at least between the routing wire and the common electrode, it is possible to electrically isolate this area, and prevent the formation of a liquid crystal film in this area. Accordingly, it is possible to avoid a display defect from arising in the overlapping area of the routing wire and the common electrode, and cause the external appearance of this area to be substantially equivalent to the external appearance of the area where the liquid crystal film exists.

Note that the present invention is not limited to the subject matter of the embodiments explained above, and may be variously modified and worked within the scope of the gist of the present invention. For example, while both the upper substrate and the lower substrate are translucent in the foregoing embodiments, so as long as one substrate is translucent, the other substrate may be a substrate that is not translucent. For example, a metal film may be formed on the glass substrate, or a metal thin plate that is flexible but not translucent (for instance, a stainless plate or aluminum foil) may also be used. Moreover, when using a metal thin plate as the substrate, in a case where a static drive in which the common electrode is common across the entire surface is adopted, the formation of the electrode on the substrate can be omitted by using the substrate itself as the electrode.

Example 1

An example of a liquid crystal display in which the upper and lower substrates are glass substrates is now explained.

Prepared was a substrate having a sheet resistance of 30 n/sq. obtained by one face of a blue plate glass with a thickness of 0.7 mm being polished and subject to a $SiO_2$ undercoat, and a transparent conductive film made of ITO (indium tin oxide) thereafter being deposited on the entire face of the substrate surface. Segment electrodes and routing wires were formed on one face of the substrate by patterning the transparent conductive film via the photolithography process and the wet etching process.

A horizontal alignment film was pattern-printed on this substrate (hereinafter referred to as the "lower substrate") within the seal frame via the flexographic printing method, and calcination was performed based on predetermined conditions. The lower substrate was subsequently subject to the rubbing process based on predetermined conditions.

Subsequently, a solution containing photosensitive resin having refractive index anisotropy of approximately 0.15 and which shows liquid crystallinity was applied on the lower substrate with a spinner, this was pre-baked at 60° C. for 120 seconds, and 1000 mJ of ultraviolet rays based on a high pressure mercury lamp light source was exposed using a contact exposure machine via a photomask of an intended pattern. Here, the solution was doped with a moderate amount of a chiral material so that the molecular alignment becomes a 90° right twisted alignment when the film thickness after deposition is 3.3 nm. After exposure, immersion development was performed using a TMAH (tetramethylammonium hydroxide) 0.1% aqueous solution, rinsed with purified water to achieve the substitution of the developing solution and the purified water, the lower substrate was dried, and calcined in a 240° C. oven for 20 minutes. Note that the photomask was provided with a rhomboid pattern in which one side thereof is 20 nm, as the light-shielding pattern in which spacers will be disposed, in 100 nm intervals respectively on the left, right, top and bottom of at least the entire face of the area where the common electrode and the routing wire on the lower substrate overlap, and the remaining area within the seal frame. Note that the film thickness of the resin film was approximately 3.3 nm based on the measurement results of the stylus profile meter.

The production process of the lower substrate (segment substrate) was as described above. Meanwhile, the upper substrate (common substrate) was obtained as follows; namely, prepared was a substrate having a sheet resistance of 30 n/sq. similarly obtained by one face of a blue plate glass with a thickness of 0.7 mm being polished and subject to a $SiO_2$ undercoat, and a transparent conductive film made of ITO (indium tin oxide) thereafter being deposited on the entire face of the substrate surface, and no processing other than cleaning was performed. In other words, the prepared upper substrate is a substrate in which a common electrode made from a transparent conductive film is formed on the entire substrate surface. A pattern was formed on the upper substrate so that a horizontal alignment film is printed only within the seal frame, and the rubbing process was performed based on the same conditions of the lower substrate described above.

Subsequently, a seal member containing 2 wt % of silica particles with a particle size of 3.2 nm was applied on the lower substrate with a dispenser in a frame shape that is 1 mm smaller than the outer frame of the in-plane area where the upper substrate and the lower substrate overlap. However, the seal member applied to the conductive pad part provided to the lower substrate was provided with 2 wt % of gold-coated plastic particles with a particle size of 3.5 nm in addition to the foregoing silica particles. Moreover, an inlet for vacuum injection as disposed at a part of the right side end of the liquid crystal display. Subsequently, the upper substrate and the lower substrate were respectively attached by positioning the end faces of both substrates so that the rubbing direction performed to the respective substrates becomes a positional relationship of a right twist of 90°, and this was calcined at 150° C. for 60 minutes in a state of being pressed at constant pressure.

Subsequently, a liquid crystal composition obtained by adding 0.1 wt % of a chiral material R811 to a liquid crystal material in which $\Delta\epsilon > 0$ and $\Delta n$ is approximately 0.15 was injected from the foregoing inlet into the gap between the upper substrate and the lower substrate via vacuum injection, and the inlet was sealed with ultraviolet curable resin. Subsequently, the substrate end face of the external extraction electrode terminal area of the lower substrate was chamfered, and the aggregation (liquid crystal cells) of the lower substrate and the upper substrate was washed with a neutral detergent, and then dried.

Subsequently, a polarizer was attached to the respective outer sides of the upper substrate and the lower substrate. The respective polarizers were disposed so that their mutual absorption axes are substantially orthogonal, and the rubbing direction and the absorption axis of the respective substrates are substantially parallel. Finally, a lead frame was mounted on the external extraction electrode terminal area, and connected to a drive circuit to complete the liquid crystal display.

With respect to the liquid crystal display of Example 1, when the display state during non-application of voltage was obtained, it was possible to confirm that a favorable bright display state was obtained in both the display area, which is the portion where the liquid crystal film exists, and the portion where the liquid-crystalline resin film exists. Accordingly, it is considered that the 90° twisted horizontal alignment is being realized in both portions. Moreover, when confirming the operation of the liquid crystal display of Example 1 during the viewing of the liquid crystal display from the front, it was possible to confirm that a dark display state was obtained in the display pattern portion shown in FIG. 1. In addition, the areas other than the display area maintained the same bright display state as during non-application of voltage during the viewing of the liquid crystal display from the front, and no defect such as the visual recognition of a boundary line between the area where the liquid crystal film exists and the area where the liquid-crystalline resin film exists could be confirmed. In other words, a favorable normally white mode had been realized.

Example 2

An example of a liquid crystal display in which a film substrate is used as the upper substrate, and a glass substrate is used as the lower substrate is now explained.

An ITO transparent conductive film was deposited, in a thickness of 200 nm, on a white plate glass with a thickness of 0.3 mm by using an in-line sputtering device, and segment electrodes and routing wires were formed on one face of the substrate by patterning the transparent conductive film via the photolithography process and the wet etching process.

A horizontal alignment film was pattern-printed on this substrate (hereinafter referred to as the "lower substrate") within the seal frame via the flexographic printing method, and calcination was performed based on predetermined conditions. The lower substrate was subsequently subject to the rubbing process based on predetermined conditions.

Subsequently, a solution containing photosensitive resin having refractive index anisotropy of approximately 0.15 and which shows liquid crystallinity was applied on the lower substrate with a spinner, this was pre-baked at 60° C. for 120 seconds, and 1000 mJ of ultraviolet rays based on a high pressure mercury lamp light source was exposed using a contact exposure machine via a photomask of an intended pattern. Here, the solution was doped with a moderate amount of a chiral material so that the molecular alignment becomes a 90° right twisted alignment when the film thickness after deposition is 3.3 nm. After exposure, immersion development was performed using a TMAH (tetramethylammonium hydroxide) 0.1% aqueous solution, rinsed with purified water to achieve the substitution of the developing solution and the purified water, the lower substrate was dried, and calcined in a 240° C. oven for 20 minutes. Note that the photomask was provided with a rhomboid pattern in which one side thereof is 20 nm, as the light-shielding pattern in which spacers will be disposed, in 100 nm intervals respectively on the left, right, top and bottom of at least the entire face of the area where the common electrode and the routing wire on the lower substrate overlap, and the remaining area within the seal frame. Note that the film thickness of the resin film was approximately 3.3 nm based on the measurement results of the stylus profile meter.

The production process of the lower substrate (segment substrate) was as described above. Meanwhile, as the upper substrate, used was a film substrate with a thickness of about 120 nm obtained by depositing a transparent conductive film having a sheet resistance of 30 Ω/sq. on the surface of a polycarbonate film with an extremely low in-plane phase difference. A horizontal alignment film was formed on the upper substrate based on the same conditions of the lower substrate described above.

Subsequently, a seal member containing 2 wt % of silica particles with a particle size of 3.2 nm was applied on the lower substrate with a dispenser in a frame shape that is 1 mm smaller than the outer frame of the in-plane area where the upper substrate and the lower substrate overlap. However, the seal member applied to the conductive pad part provided to the lower substrate was provided with 2 wt % of gold-coated plastic particles with a particle size of 3.5 nm in addition to the foregoing silica particles. Moreover, an inlet for vacuum injection as disposed at a part of the right side end of the liquid crystal display. Subsequently, the upper substrate and the lower substrate were respectively attached by positioning the end faces of both substrates, and this was calcined at 150° C. for 60 minutes in a state of being pressed at constant pressure. Here, in order to uniformly press the upper substrate and the lower substrate, a dummy glass substrate having the same size and made from the same material as the lower substrate was disposed on the outer side of the film on the upper substrate side using the film substrate.

Subsequently, a liquid crystal composition obtained by adding 0.1 wt % of a chiral material R811 to a liquid crystal material in which $\Delta\epsilon > 0$ and $\Delta n$ is approximately 0.15 was injected from the foregoing inlet into the gap between the upper substrate and the lower substrate via vacuum injection, and the inlet was sealed with ultraviolet curable resin. Subsequently, the substrate end face of the external extraction electrode terminal area of the lower substrate was chamfered, and the aggregation (liquid crystal cells) of the lower substrate and the upper substrate was washed with a neutral detergent, and then dried.

Subsequently, a polarizer was attached to the respective outer sides of the upper substrate and the lower substrate. The respective polarizers were disposed so that their mutual absorption axes are substantially orthogonal, and the rubbing direction and the absorption axis of the respective substrates are substantially parallel. Finally, a lead frame was mounted on the external extraction electrode terminal area, and connected to a drive circuit to complete the liquid crystal display.

With respect to the liquid crystal display of Example 2, when the display state during non-application of voltage was observed, it was possible to confirm that a favorable bright display state was obtained in both the display area, which is the portion where the liquid crystal film exists, and the portion where the liquid-crystalline resin film exists. Accordingly, it is considered that the 90° twisted horizontal alignment is being realized in both portions. Moreover, when confirming the operation of the liquid crystal display of Example 2 during the viewing of the liquid crystal display from the front, it was possible to confirm that a dark display state was similarly obtained as with the liquid crystal display of Example 1. Moreover, the liquid crystal display of Example 2 is flexible, and could be retained in a curved state having a curvature radius of about 300 mm.

Note that, in order to realize multiplex driving of ½ duty or more, it is necessary to perform patterning so that the spacing between the respective scanning lines becomes a fixed interval as shown in FIG. 8. In the foregoing case, while the processing may be performed based on the foregoing conventional photolithography process and etching process, since the area of the conductive film to be removed is small, the manufacturing process can be shortened by adopting the laser etching method. The laser etching method is the etching method of evaporating the transparent conductive film based on laser beam irradiation and directly performing the patterning process. This method is particularly effective in a case of using a film substrate as shown in Example 2, and the options of the film material can be broadened since materials with weak resistance against acid chemicals such as hydrochloric acid, sulfuric acid, and ferric chloride used in the wet etching process can also be used as the material. As the film material, since a material capable of reducing the in-plane phase difference and a material which enables the deposition of a transparent electrode is effective, in addition to the polycarbonate used in Example 2, triacetylcellulose, norbornene-based cyclic olefin or polyether sulfone, transparent polyimide and the like with a high glass transition point may also be used.

What is claimed is:
1. A segment-type liquid crystal display, comprising:
a first substrate and a second substrate placed opposite each other in a stacking direction;
a common electrode provided on one face side of the first substrate so as to substantially cover a whole surface;
a first alignment film provided on said one face side of the first substrate so as to cover the common electrode;
a segment electrode provided on one face side of the second substrate, wherein the segment electrode defines a display pattern;
a routing wire provided on said one face side of the second substrate and connected to the segment electrode, wherein the routing wire extends from the segment electrode to a segment electrode external extraction terminal;
a second alignment film provided on said one face side of the second substrate so as to cover the segment electrode and the routing wire;
a non-conductive liquid-crystalline resin film without electrical conductivity provided on said one face side of the second substrate; and
a liquid crystal film provided between the first substrate and the second substrate, and being subject to twisted alignment between the first substrate and the second substrate,
wherein the non-conductive liquid-crystalline resin film has a refractive index anisotropy which is substantially equal to a refractive index anisotropy of a liquid crystal material of the liquid crystal film, is subject to twisted alignment, and is disposed in a manner of filling at least a space between the routing wire and the common electrode in the stacking direction,
wherein the liquid crystal film is disposed in a manner of filling at least a space between the segment electrode and the common electrode in the stacking direction,
wherein the common electrode, the segment electrode, the routing wire, the liquid crystal film, and the non-conductive liquid-crystalline resin film are disposed in an effective display area of the segment-type liquid crystal display device,
wherein a first area of the effective display area where the segment electrode and the common electrode overlap in the stacking direction with the liquid crystal film interposed therebetween is a display-state changeable region which is switchable between a first display state and a second display state in accordance with a voltage applied thereto which changes the alignment of the liquid crystal film, and wherein a second area of the effective display area where the routing wire and the common electrode overlap in the stacking direction with the non-conductive liquid-crystalline resin film interposed therebetween is a display-state unchangeable region having a display state which is unchangeable in response to a voltage applied thereto.

2. The liquid crystal display according to claim 1, wherein the liquid-crystalline resin film is disposed in a manner of filling a space between a part where neither the segment electrode nor the routing wire is provided on said one face side of the second substrate, and the common electrode.

3. The liquid crystal display according to claim 1, further comprising a dummy electrode complementarily disposed, on said one face side of the second substrate, in an area other than an area where the segment electrode and the routing wire are disposed.

4. The liquid crystal display according to claim 1, wherein the common electrode is divided into a plurality of portions, and substantially fully covers said one face side of the first substrate by combining the plurality of divided portions.

5. The liquid crystal display according to claim 1, wherein the first substrate is a plastic substrate or a film substrate.

* * * * *